Feb. 23, 1971  I. H. FRIEDMAN, JR., ET AL  3,564,845
MEMBRANE SEAL ASSEMBLY FOR USE WITH SOLID PROPELLANT ROCKET
MOTORS HAVING SELECTIVE ZONING CAPABILITIES
Filed Sept. 19, 1968

Isidore H. Friedman Jr. INVENTORS
Glenn E. Webb Jr.

BY

ATTORNEY

United States Patent Office 3,564,845
Patented Feb. 23, 1971

3,564,845
MEMBRANE SEAL ASSEMBLY FOR USE WITH SOLID PROPELLANT ROCKET MOTORS HAVING SELECTIVE ZONING CAPABILITIES
Isidore H. Friedman, Jr., and Glenn E. Webb, Jr., Huntsville, Ala., assignors to Thiokol Chemical Corporation, Bristol, Pa., a corporation of Delaware
Filed Sept. 19, 1968, Ser. No. 760,827
Int. Cl. F02k 9/04, 9/06
U.S. Cl. 60—39.47
1 Claim

ABSTRACT OF THE DISCLOSURE

A rupturable membrane seal assembly for use in separating the zones of a solid propellant grain in a solid propellant rocket motor having selective zoning capabilities that will be disintegrated, when the pressure in a gas generator separated from the solid propellant rocket motor by the membrane seal assembly becomes greater than the pressure in the solid propellant rocket motor.

BACKGROUND OF THE INVENTION

(1) Field of the invention

For many years it has been demonstrated that small solid propellant rocket motors, containing less than 800 pounds of a solid propellant grain, could be successfully produced to possess the capabilities of being able to "start-stop-restart," a technique now referred to as selective zoning, by using the barrier concept of termination, and the injection of a liquid igniting material into a solid propellant rocket motor to ignite subsequent zones of a propellant grain in the solid propellant rocket motor.

It was found, however, that if a solid propellant gas generator was used instead of the injection of the liquid igniting material, that a much improved selective zoning technique would be achieved. Therefore, new techniques had to be developed, for the old technique used in previous selective zoning solid propellant rocket motors, could not be transferred to a solid propellant rocket motor using a gas generator, to meet the operational requirements, that were needed for the new concept of a selective zoning solid propellant rocket motor.

The instant invention, therefore, was developed to include the use of a gas generator, the barrier concept and a membrane seal assembly that would provide a complete start-stop-restart concept to a solid propellant rocket motor to meet the new operational requirements.

(2) Description of the prior art

As has been previously stated, the selective zoning concept had been applied to small solid propellant rocket motors and the use of a liquid igniting material that reacts hypergolically with the barriers to permit reignition of the solid propellant grain had also been utilized. The instant invention, however, does not use a liquid igniting material, but uses a special formulation of barrier material that will not ignite from the burning of the first layer of solid propellant grain, but can be destroyed by the use of a gas generator that is mounted on the solid propellant motor, thus the membrane seal assembly is a new technique that is not in use at the present time.

SUMMARY OF THE INVENTION

This invention, therefore, relates to improvements in selective zoning techniques for solid propellant rocket motors, wherein a membrane seal assembly is utilized to provide "start-stop-restart" capabilities for large solid propellant rocket motors.

The selective zoning technique in use at the present time utilizes two or more concentric layers or zones of a solid propellant grain with a suitable barrier separating the layers of the solid propellant grains and the barrier must be of a material that will stop burning of one layer or zone of a solid propellant grain, yet be susceptible to destruction so that the next adjacent layer of a solid propellant grain may be ignited as prescribed by the operational flight requirement that must be achieved by the larger solid propellant rocket motor.

As previously stated, there are two or more zones or layers of solid propellant grains that are utilized in a solid propellant rocket that possesses selective zoning capabilities and it is a positive necessity that the igniters that are used to ignite the second layer or zone of the solid propellant grain be positively sealed from the combustion chamber of the solid propellant rocket motor during the burning of the first zone or layer of the solid propellant grain.

The instant invention is provided to seal such secondary igniters and since the mass discharge of the secondary igniters is relatively high, the orifices of the membranes seal assembly must be relatively large to vent the high temperature ignition gases into the combustion chamber of the solid propellant rocket motor and the membrane seal of the membrane seal assembly must reliably close such orifices until the action of the secondary igniters is required. However, when the secondary igniters are actuated, it is also imperative that the membrane seal be destructible to vent such hot gases immediately into the combustion chamber of the solid propellant rocket motor to prevent a pressure spike in the solid propellant rocket motor.

It is also a necessity that the membranes seal be formed from a material that will not create hard inert debris that, when injected into the combustion chamber of the solid propellant rocket motor, will damage other inert components of the solid propellant rocket motor, such as for example the insert for the nozzle of the solid propellant rocket motor.

It is an object of this invention, therefore, to provide a membrane seal assembly that will positively seal a secondary zone of a solid propellant rocket motor having selective zoning capabilities from a primary zone of the solid propellant rocket motor until it is a requirement that the secondary zone of the solid propellant rocket motor be ignited after the complete burnout of the primary zone of the solid propellant rocket motor has been accomplished.

Another object of the invention is to provide a membrane seal assembly that will not allow hard inert debris to be injected into the combusion chamber of the solid propellant rocket motor that will damage the inert components of the solid propellant rocket motor.

With the above and other objects and advantages in view that may occur to one skilled in the art, it is to be understood that the invention comprises specific details and arrangement of parts more fully hereinafter described, claimed and illustrated in the accompanying drawing in which:

DESCRIPTION OF THE PREFERRED EMBODIMENT

Figure 1:
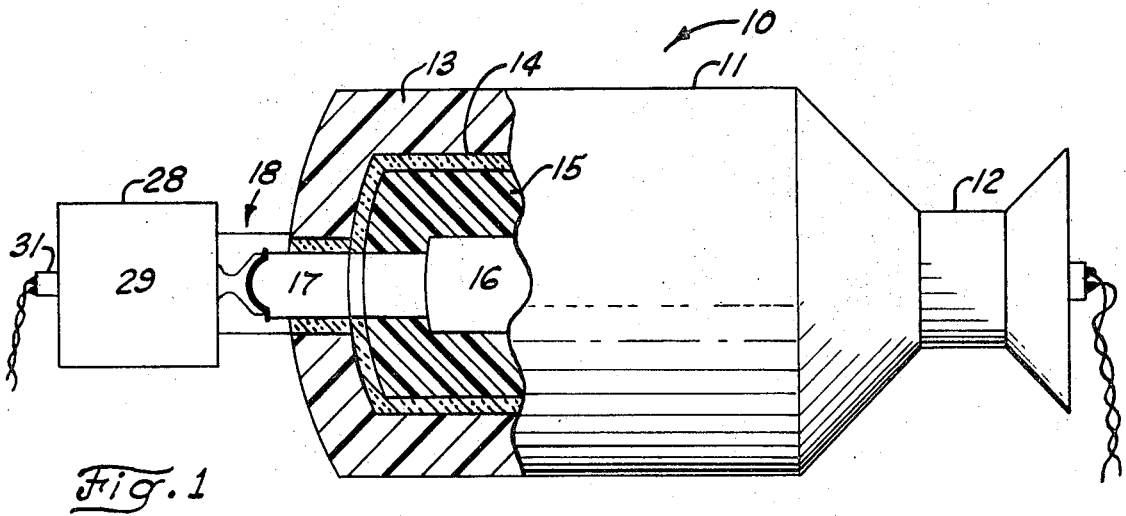
FIG. 1 is a schematic view, partly in section, illustrating the manner in which a membrane seal assembly embodying the invention is associated with a solid propellant rocket motor having selective zoning capabilities.

Referring more in detail to the drawing, wherein like parts are designated by like reference numerals, the reference numeral 10 is used to generally designate a solid propellant rocket motor.

The solid propellant rocket motor includes a rocket motor case 11 having a nozzle 12 connected to the aft end thereof as is conventional structure.

The solid propellant rocket motor 10 is constructed to have the capabilities of start-stop-restart or a selective zoning technique and to possess such capabilities, a second layer or zone of a solid propellant grain 13 is cast into and bonded to the interior surface of the rocket motor case 11. There is then bonded to the exposed surface of the layer or zone of solid propellant grain 13, a layer of an inhibiting material 14. Then a first layer or zone of solid propellant grain 15 is cast into the rocket motor case 11 and is bonded to the surface of the inhibiting material 14. The layer or zone of solid propellant grain 15 is provided with a central longitudinally extending configuration 16 which may be of any shape or size as desired.

A circular vent channel 17 extends forwardly from the configuration 16 in the layer or zone of solid propellant grain 15 outwardly of the head end of the rocket motor case 11 to communicate with a membrane seal assembly 18, as shown in FIG. 1, and the inhibiting material 14 extends into the vent channel 17.

Figure 2:
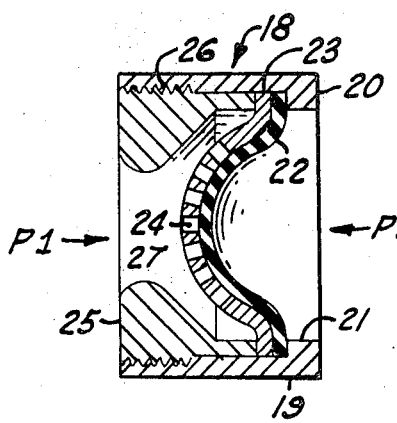
FIG. 2 is a sectional view of a membrane seal assembly embodying the invention where the pressure P2 on the membrane seal is greater than the pressure P1.

The membrane seal assembly 18 comprises a circular housing 19 which is secured to the head end of the rocket motor case 11 so that it is in alinement with the vent channel 17. The housing 19 has at the aft end thereof an internal right angularly extending flange 20 which defines thereby an opening in the circular housing 21 that is also in alinement with the vent channel 17. A circular disc-shaped rupturable membrane seal 22 is then positioned in the housing 19 and the peripheral edge thereof engages the inner surface of the flange 20. The membrane seal 22 is of such a size that it assumes a dome-shape when it is in normal position as in FIG. 2. A perforated dome-shaped support member 23, that is provided with a plurality of apertures 24, is then placed in the housing 19 and the peripheral edge of the support member 23 is contiguous with the peripheral edge of the membrane seal 22 and the membrane seal 22 being of an elastomeric material or some other fragile material conforms to the shape of and contacts the aft surface of the support member 23, also as shown in FIG. 2, to close the apertures 24, as will be later described.

A retaining member 25 is then inserted into the head end of the housing 19 and by means of screw threads 26 is retained in the housing 19 with the aft end thereof engaging the periphery of the support member 23 and retaining in the housing 19 the support member 23 and membrane seal 22.

The retaining member 25 has a central bore 27 therein which is shaped like a convergent-divergent nozzle and the central bore 27 communicates at its head end with a housing 28 of a gas generator 29 which is secured to the housing 19 of the membrane seal assembly 18 by any well-known means.

Just prior to the flight of the solid propellant rocket motor 10, a first igniter 30 is mounted in the nozzle 12 to ignite the first layer or zone of the solid propellant grain 15 and a second igniter 31 is mounted in the housing 28 of the gas generator 29, as shown in FIG. 1.

In the operation of the solid propellant rocket motor 10 and the membrane seal assembly 18, the first igniter 30 is actuated to ignite the first layer or zone of the solid propellant grain 15 to cause the burning thereof and the blast-off of the solid propellant rocket motor 10. The first layer or zone of the solid propellant grain 15 will then burn until burnout and the inhibitor material 14 will prevent the ignition or burning of the second layer or zone of solid propellant grain 13. Since the pressure P2 created by the burning of the first layer or zone of solid propellant grain 15 is greater than pressure P1 and the inhibitor material 14 prevents the ignition or burning of the second layer or zone of the solid propellant grain 13, the membrane seal 22 will remain in the position shown in FIG. 2.

Figure 3:
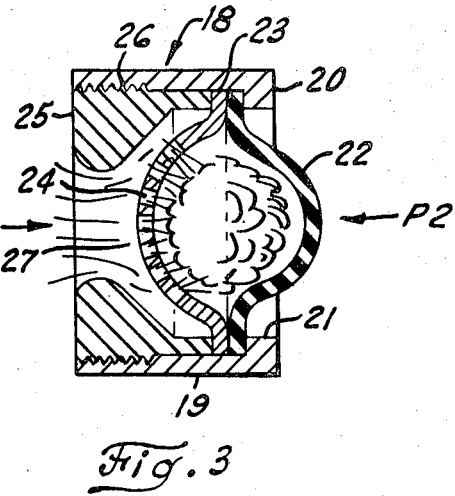
FIG. 3 is a view similar to FIG. 2, wherein the pressure P1 is beginning to exceed the pressure P2 on the membrane seal.
Figure 4:
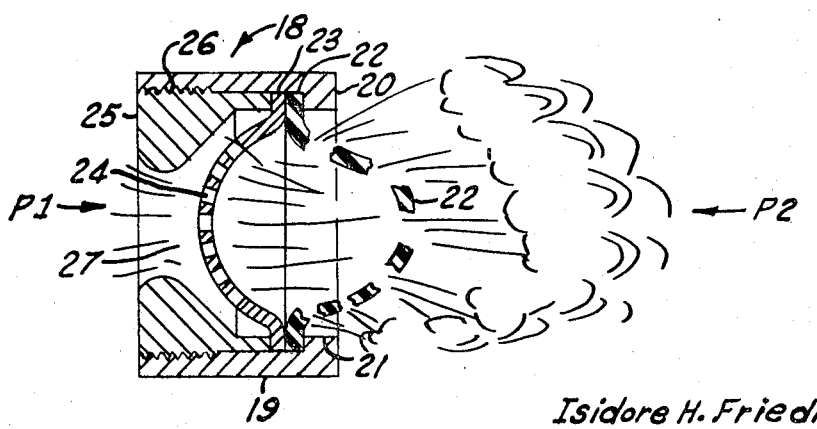
FIG. 4 is a view similar to FIGS. 2 and 3, wherein the pressure P1 is greater than the pressure P2 and the membrane seal has ruptured.

Then after completion of the burning of the first layer or zone of solid propellant grain 15 during the flight of the solid propellant rocket motor 10 and when it is desired to ignite the second layer or zone of the solid propellant grain 13, the igniter 31 is actuated by any well-known system to ignite the gas generator 29. As the pressure within the gas generator 29 increases, it will pass through the apertures 24 in the support member 23 to force the membrane seal 22 aft, as shown in FIG. 3, as the pressure increases the membrane seal 22 will be ruptured, as shown in FIG. 4, because at this time pressure P1 is greater than pressure P2 and such pressure exiting through the channel vent 17 will destroy the inhibitor material 14 and subsequently cause ignition of the second layer or zone of the solid propellant grain 13, and as the gas generator 29 continues to operate the support member 23 will be finally disintegrated. It is to be noted that the area of perforations in the support member 23 provide a greater escape area for the pressure created by the gas geneator 29 than does the area of the bore 27 of the retaining member 25, thus full flow of the pressure from the gas generator 29 into the solid propellant rocket motor 10 will be achieved.

The membrane seal assembly 18 thus provides a perfect seal for the vent channel 17, preventing any pressure from passing outwardly of the rocket motor case 11, yet permitting ingress of the pressure from the gas generator 29 when it is desired to ignite the second layer or zone of the solid propellant grain 13.

Neither the membrane seal 22 nor the support member 23 will, when destroyed, create any debris that may clog the nozzle 12 or damage any of the inert components of the solid propellant rocket motor 10.

If it is desired to further seal the retaining member 25 in the housing 19, O-rings may be used and if the means for fastening the housing 28 of the gas generator 29 to the membrane seal assembly 18 requires threaded sockets in the retaining member 26, such may be employed as in the usual manner.

The membrane seal assembly 18 thus operates as a one way check valve to permit flow in one direction, but prohibit flow in the opposite direction, it thus may also function in other applications as a safety valve to relieve pressure that reaches a danger point, in for instance, a container, thus the rupturing of the membrane seal 22 would prevent damage to a container with which it may be associated.

There has thus been described a membrane seal assembly that is adaptable for use with a solid propellant rocket motor possessing selective zoning capabilities and it is believed that the mode of operation and the structure thereof will be clear to one skilled in the art, it also being understood that variations in the mode of operation and structure of the invention may be adhered to provided such variations fall within the spirit of the invention and the scope of the appended claim.

Having thus described the invention what is claimed as new and desired to be secured by Letters Patent is:

1. A membrane seal assembly for solid propellant rocket motors having two or more concentric layers of solid propellant grains therein, separated by an inhibitor barrier, two or more igniters connected to the fore and aft ends of said solid propellant rocket motor to alternately ignite the said layers of solid propellant grains, said membrane seal assembly comprising a circular housing having at the aft end thereof an internal right angularly extending flange defining a central opening therein, a circular disc-shaped elastomeric rupturable membrane seal positioned in said housing so that the peripheral edge of said seal engages the inner surface of said flange, a perforated dome-shaped support member positioned in said housing so that the peripheral edge of said support member is contiguous with the peripheral edge of said membrane seal and in contact therewith so that said membrane seal will conform to the shape of said support member, a retaining member inserted into the head end of said housing to engage said support member to retain said support member and said membrane seal in said housing, said retaining member having a central bore therein, a gas generator housing mounted on said retaining member in communication with said bore, one of said igniters being mounted in said generator housing so that when said one igniter is actuated the pressure created by the ignition of said gas generator will rupture said membrane seal to permit the burning of said inhibitor barrier and the subsequent ignition of one of said layers of said solid propellant grains after the other of the said layers of solid propellant grain has burned out.

References Cited

UNITED STATES PATENTS

| | | | |
|---|---|---|---|
| 2,764,173 | 9/1956 | Renner | 220—89A |
| 2,766,904 | 10/1956 | Philip | 137—68UX |
| 3,293,855 | 12/1966 | Cuttill et al. | 60—254X |
| 3,340,691 | 9/1967 | Mangum | 60—250 |
| 3,354,647 | 11/1967 | Aycock | 60—250X |

CARLTON R. CROYLE, Primary Examiner

U.S. Cl. X.R.

60—39.82, 250, 256; 137—68; 220—89A